US008610535B2

(12) United States Patent
Hui

(10) Patent No.: US 8,610,535 B2
(45) Date of Patent: Dec. 17, 2013

(54) DOOR LOCKING SYSTEM

(75) Inventor: Kin Fai Hui, Hong Kong (HK)

(73) Assignee: Austin Hughes Electronics Limited, Hong Kong (HK)

( * ) Notice: Subject to any disclaimer, the term of this patent is extended or adjusted under 35 U.S.C. 154(b) by 328 days.

(21) Appl. No.: 13/086,392

(22) Filed: Apr. 14, 2011

(65) Prior Publication Data

US 2011/0254658 A1 Oct. 20, 2011

Related U.S. Application Data

(60) Provisional application No. 61/324,787, filed on Apr. 16, 2010.

(51) Int. Cl.
*G06F 7/04* (2006.01)

(52) U.S. Cl.
USPC ................ 340/5.2; 340/542; 340/540; 70/57; 70/278.3; 709/219; 709/249

(58) Field of Classification Search
USPC ........ 340/542–43, 545.7, 686.6, 426.28, 430, 340/5.83, 5.72, 5.61–2; 70/57, 278.3; 709/219, 278.3, 249
See application file for complete search history.

(56) References Cited

U.S. PATENT DOCUMENTS

| | | | | |
|---|---|---|---|---|
| 5,791,178 | A * | 8/1998 | Chamberlain et al. | 70/278.3 |
| 2003/0061344 | A1* | 3/2003 | Monroe | 709/224 |
| 2003/0164763 | A1* | 9/2003 | Hisano et al. | 340/539.13 |
| 2007/0130294 | A1* | 6/2007 | Nishio | 709/219 |
| 2007/0290789 | A1* | 12/2007 | Segev et al. | 340/5.6 |
| 2007/0290793 | A1* | 12/2007 | Tran | 340/5.64 |
| 2009/0205384 | A1* | 8/2009 | Pomerantz | 70/278.3 |
| 2009/0273440 | A1* | 11/2009 | Marschalek et al. | 340/5.61 |
| 2009/0302995 | A1* | 12/2009 | Park | 340/3.1 |
| 2010/0031713 | A1* | 2/2010 | Brown et al. | 70/91 |
| 2010/0050705 | A1* | 3/2010 | Hakansson et al. | 70/57 |
| 2010/0148919 | A1* | 6/2010 | Roberts et al. | 340/5.2 |
| 2010/0318685 | A1* | 12/2010 | Kraus et al. | 709/249 |

* cited by examiner

*Primary Examiner* — Benjamin C Lee
*Assistant Examiner* — Chico A Foxx

(57) ABSTRACT

A door locking system configured to lock and unlock a door frame of a cabinet is provided. The door locking system includes a handle rod; a digital or mechanical door sensor configured to detect whether the door frame of the cabinet is open or closed; and a latch configured to lock the handle rod, the latch being connected to and controlled by a lock mechanism. The lock mechanism includes a mechanical module and an electromechanical module. The mechanical module is configured to actuate the latch to lock and unlock the handle rod, and configured to grant the electromechanical module control over the latch to lock and unlock the handle rod.

21 Claims, 9 Drawing Sheets

DOOR LOCKING SYSTEM

CROSS-REFERENCE TO RELATED APPLICATIONS

This application claims the benefit of U.S. Provisional Application No. 61/324,787, filed on Apr. 16, 2010; the contents of which is hereby incorporated by reference.

FIELD OF THE PATENT APPLICATION

The present patent application relates to a door locking system and more particularly to a door locking system that includes an electrically lockable swivel lever actuating mechanism for cabinet.

BACKGROUND

A conventional swivel lever actuating mechanism mounted on a door frame simply locks and unlocks the cabinet, without the detection of whether the door frame is open or closed in a cabinet. This is a not convenience for many applications.

It is desired to have a door locking system mounted on door frame in a cabinet that includes a swivel level actuating mechanism of locking and unlock the door frame, and built-in sensor(s) to detect the door frame status of whether the door frame is open or closed in a cabinet.

SUMMARY

The present patent application is directed to a door locking system configured to lock and unlock a door frame of a cabinet. In one aspect, the door locking system includes a handle rod; a digital or mechanical door sensor configured to detect whether the door frame of the cabinet is open or closed; and a latch configured to lock the handle rod, the latch being connected to and controlled by a lock mechanism. The lock mechanism includes a mechanical module and an electromechanical module. The mechanical module is configured to actuate the latch to lock and unlock the handle rod, and configured to grant the electromechanical module control over the latch to lock and unlock the handle rod.

The mechanical module may include a mechanical key lock with a dish, and the electromechanical module may include a motor or a solenoid, and is controlled by an electrical signal.

The electromechanical module may be connected to and controlled by a handle board and a RFID (radio frequency identification) board, the RFID board being configured to identify a RFID card or tag placed nearby. The handle board may be further connected to a sensor board for detecting temperature, humidity, and vibration. The handle board may be further connected to a status board for detecting the status of the mechanical module. The handle board may be further connected to a communication board for communicating with a data network either by wire or wirelessly. The RFID board may include a biometric information reader, the biometric information reader being configured to acquire biometric authentication data from a user and transmit the data to the handle board and the electromechanical module.

The door locking system may further include a main board and a network board. The communication board may be connected to the main board and the main board may be connected to a computer network through the network board.

The door locking system may further include a multi-device board. The multi-device board may be configured to connect a plurality of sensors for monitoring the operation of the door locking system.

In another aspect, the present patent application provides a door locking system including a plurality of door locks; a main board connected to the plurality of door locks; a network board connected to the main board; and a multi-device board connected to the network board. Each door lock includes a handle rod and a latch configured to lock the handle rod. The latch is connected to and controlled by a lock mechanism. The lock mechanism includes a mechanical module and an electromechanical module, the mechanical module being configured to actuate the latch to lock and unlock the handle rod, and configured to grant the electromechanical module control over the latch to lock and unlock the handle rod. The main board is connected to a computer network through the network board. The multi-device board is configured to connect a plurality of sensors for monitoring the operation of the door locking system and the environment nearby.

The handle board may be further connected to a communication board for communicating with a data network either by wire or wirelessly, and the communication board may be connected to the main board.

The main board may include a plurality of displays, the displays being configured to show the temperature or humidity data acquired from the door locking system.

In yet another aspect, the present patent application provides a door locking system including a plurality of door locks; a plurality of main boards each connected to the plurality of door locks; a plurality of network boards each connected to one of the main boards; and a plurality of multi-device boards each connected to one of the network boards. Each door lock includes a handle rod and a latch configured to lock the handle rod, the latch being connected to and controlled by a lock mechanism, the lock mechanism including a mechanical module and an electromechanical module. The mechanical module is configured to actuate the latch to lock and unlock the handle rod, and configured to grant the electromechanical module control over the latch to lock and unlock the handle rod. All the network boards are connected with each other one by one as a chain and to a computer network. Each multi-device board is configured to connect a plurality of sensors for monitoring the operation of the door locking system and the environment nearby.

BRIEF DESCRIPTIONS OF THE DRAWINGS

DETAILED DESCRIPTION

Reference will now be made in detail to a preferred embodiment of the door locking system disclosed in the present patent application, examples of which are also provided in the following description. Exemplary embodiments of the door locking system disclosed in the present patent application are described in detail, although it will be apparent to those skilled in the relevant art that some features that are not particularly important to an understanding of the door locking system may not be shown for the sake of clarity.

Furthermore, it should be understood that the door locking system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
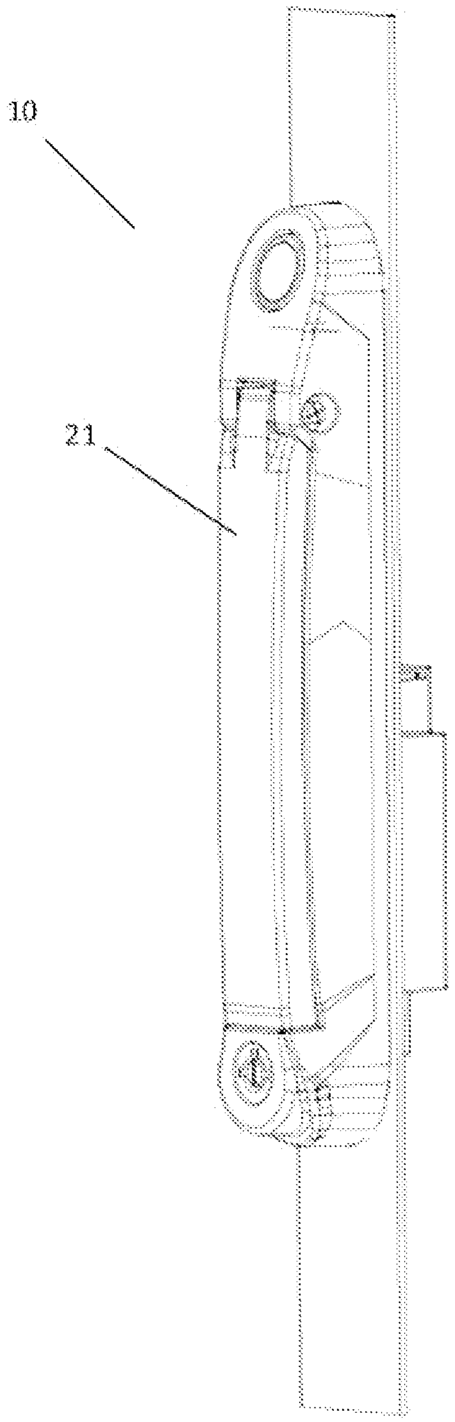
FIG. 1 is a perspective view of a door locking system according to an embodiment of the present patent application.
Figure 2:
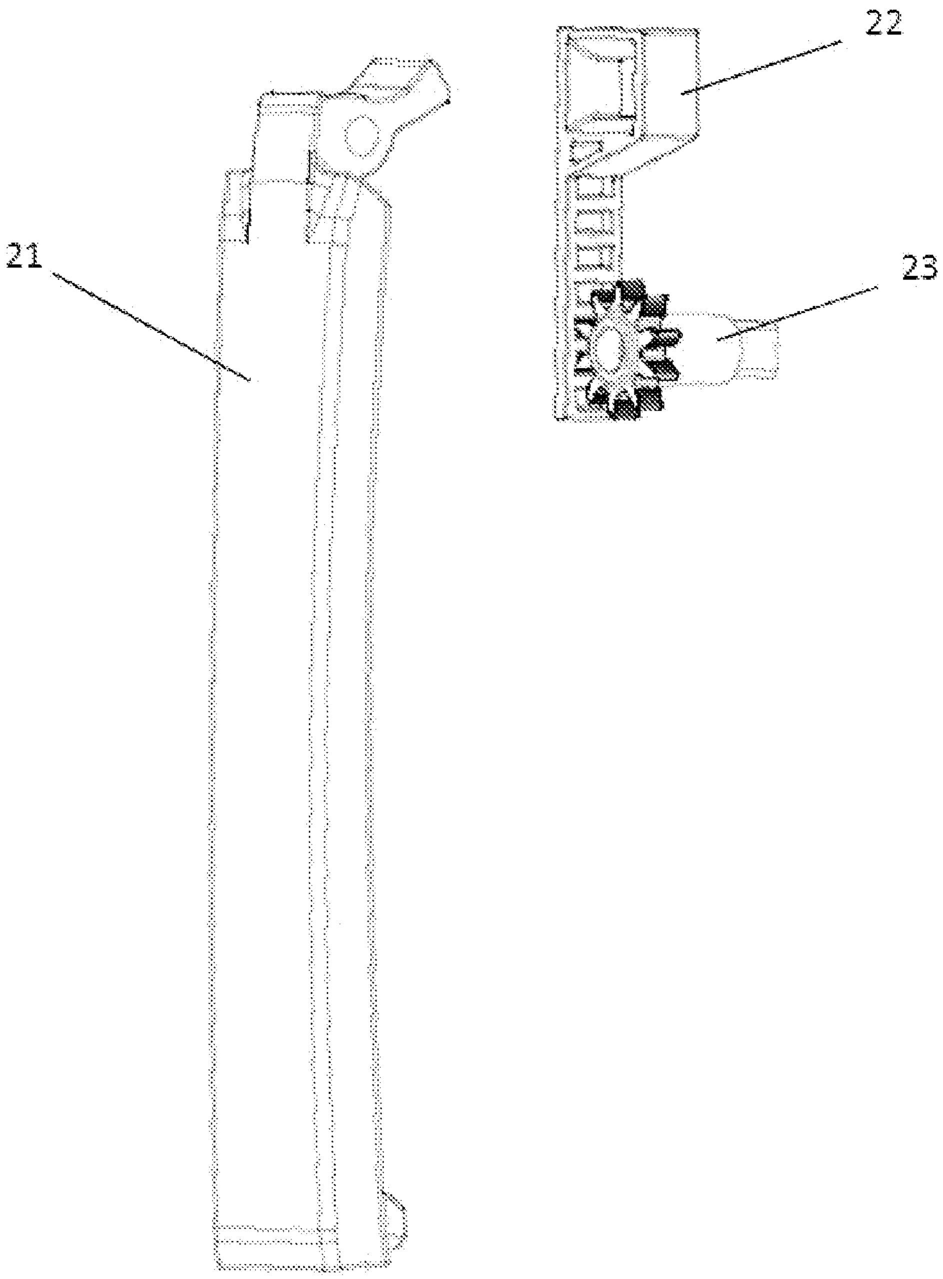
FIG. 2 is an exploded view of the door locking system depicted in FIG. 1.
Figure 3:
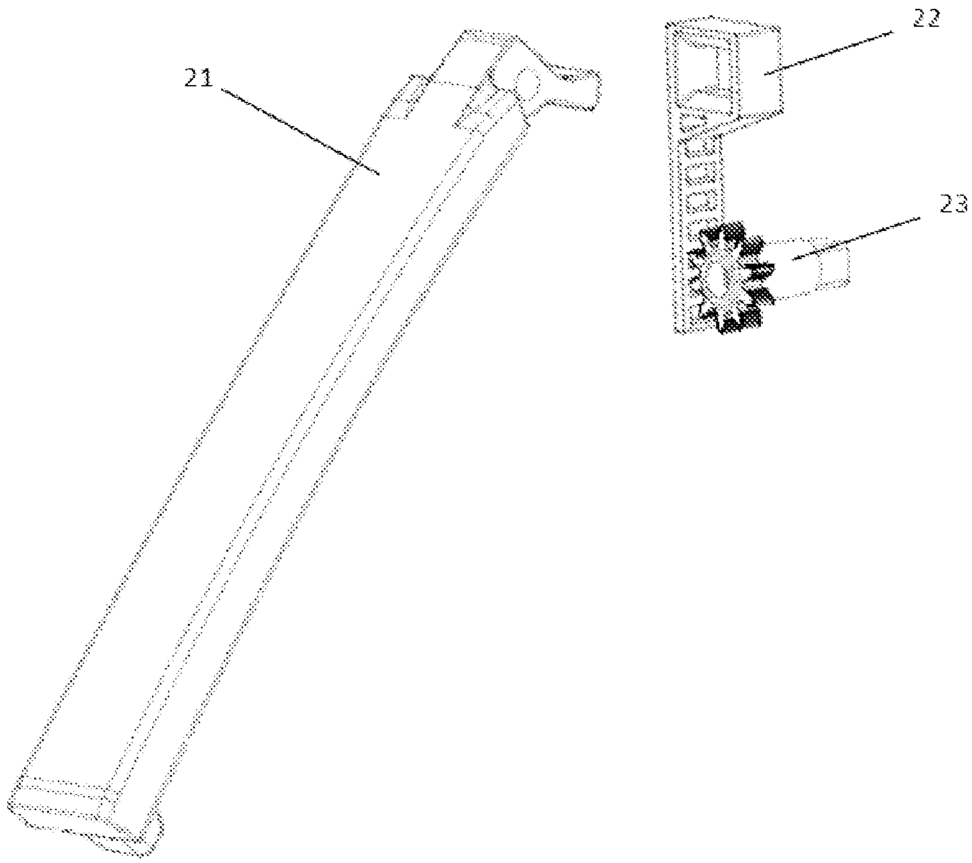
FIG. 3 is another exploded view of the door locking system depicted in FIG. 1.

FIG. 1 is a perspective view of a door locking system according to an embodiment of the present patent application. FIG. 2 is an exploded view of the door locking system depicted in FIG. 1. FIG. 3 is another exploded view of the door locking system depicted in FIG. 1. Referring to FIG. 1, the door locking system 10 includes a handle rod 21. Referring to FIG. 2, the handle rod 21 is at the lock position with a ladder 22 and a gear 23 to lock the door. Referring to FIG. 3, the handle rod 21 is configured to be inserted into the ladder 22. The handle rod 21 can move out from the lock position to activate the ladder 22, and then the ladder 22 can drive the gear 23 to unlock the door.

Figure 4:
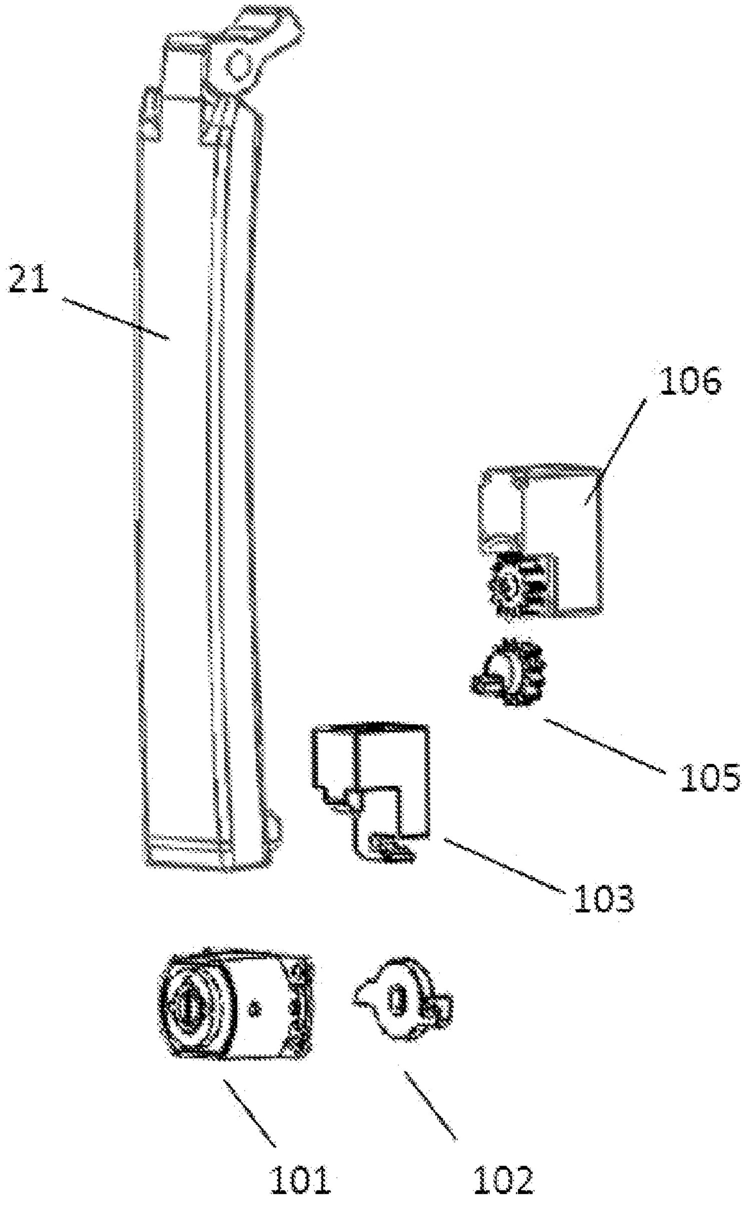
FIG. 4 is yet another exploded view of the door locking system depicted in FIG. 1.

FIG. 4 is yet another exploded view of the door locking system depicted in FIG. 1. Referring to FIG. 4, the handle rod 21 can be further locked by a latch 103. The latch 103 is connected to and controlled by two modules which include an electromechanical module and a mechanical module.

The electromechanical module includes an electromechanical device 106 and a gear 105. The electromechanical device 106 includes a motor to spin the gear 105. The gear 105 has a lock position to lock the handle rod 21 and unlock position to unlock the handle rod 21. The electromechanical device 106, which is controlled by an electrical signal, may also include a solenoid. The mechanical module includes a mechanical key lock 101 with a dish 102. The latch 103 has a lock position to lock the handle rod 21 and an unlock position to unlock the handle rod 21.

The mechanical module has three types of control to the latch 103. The control types are selected by a correct key turning the dish 102 of the mechanical key lock 101 to three different positions. The three different positions are as follows:

1) a position to lock the handle rod 21 through the latch 103 in a lock position;

2) a position to unlock the handle rod 21 through the latch 103 in an unlock position, while the electromechanical module cannot control the handle rod 21; and 3) a position to unlock the handle rod 21 through the latch 103 in an unlock position, while the electromechanical module can further lock and unlock the handle rod 21 through latch 103. More particularly, the electromechanical module can lock and unlock the handle rod 21 by spinning the gear 105 with regard to the latch 103 to lock and unlock position.

Figure 5:
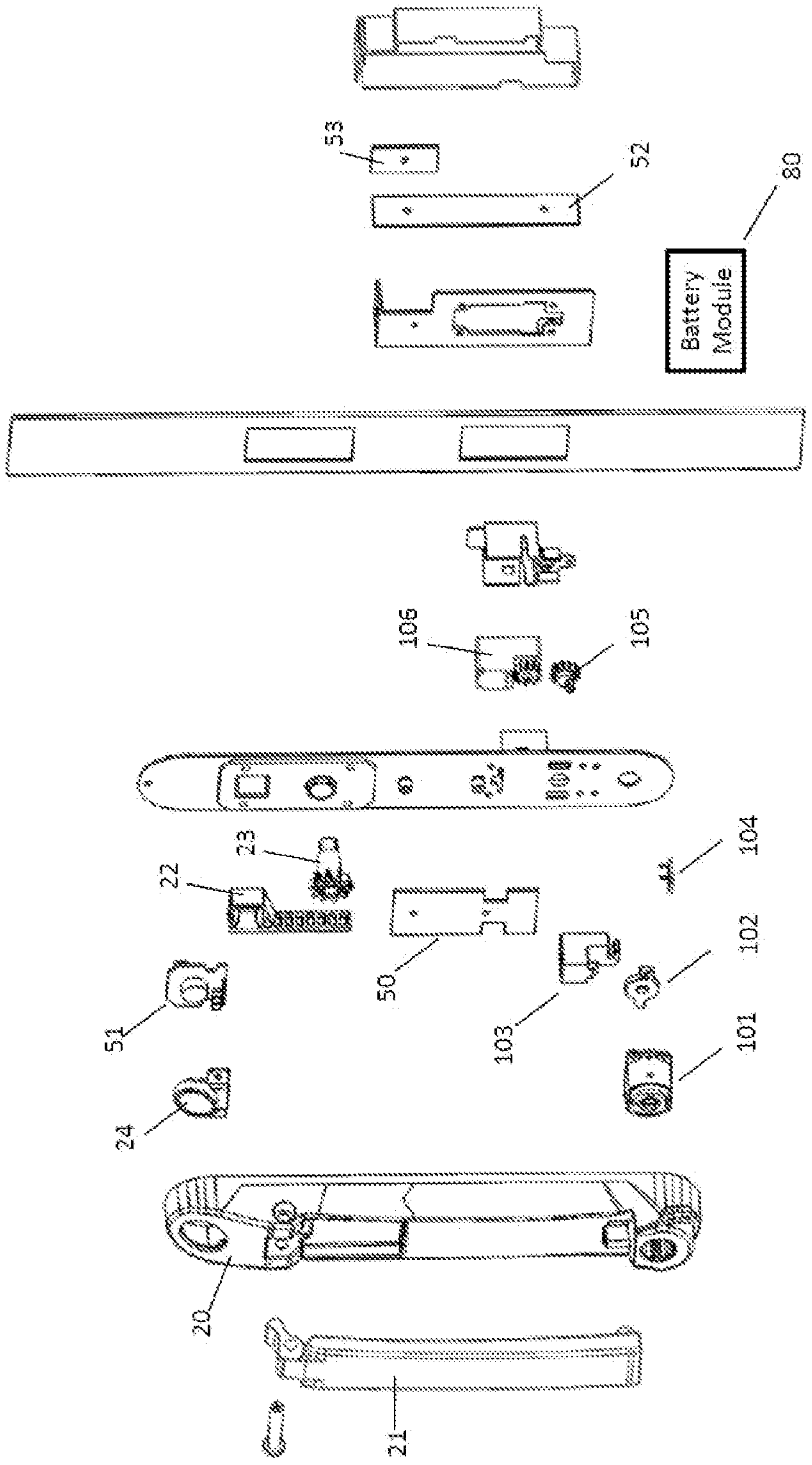
FIG. 5 is still another exploded view of the door locking system depicted in FIG. 1.

FIG. 5 is still another exploded view of the door locking system depicted in FIG. 1. Referring to FIG. 5, the door lock 20 with the handle rod 21 is configured to lock and unlock the door frame of a cabinet. The electromechanical module is connected to and controlled by a handle board 50 and a RFID board 51. The RFID board 51 contains a RFID sensor to detect identification data from the RFID card or tag, and also has the signal display (for example, LED or LCD) through a lens 24. The lens 24 can transmit light toward the outside of the door locking system to indicate to the user whether the RFID card or tag can be identified, and the handle rod 21 can be unlocked. If the RFID card or tag is valid, the electromechanical module is configured to unlock the handle rod 21.

It is noted that the RFID board may include one or a plurality of biometric information readers. The biometric information reader is configured to acquire biometric authentication data from a user and transmit the data to the handle board 50 and the electromechanical module.

The handle board 50 connected to a sensor board 52, where the sensor board 52 is connected to different sensors to detect including but not limited to temperature, humidity, water leak, vibration, and door status and/or position.

The handle board 50 may be further connected to a sensor board 52 to detect the temperature, humidity, water, vibration and door status and/or position. The sensor board 52 may include a tact switch, an optical sensor, and/or a magnetic sensor.

The handle board 50 may be further connected to a status board 104 to detect whether the mechanical module is in a position to lock the door frame, a position to unlock the door frame, or a position to unlock the door frame and let the electromechanical module control the locking status of the door frame, i.e. a position to grant the electromechanical module control over the latch 103 to lock and unlock the handle rod 21.

The handle board 50 may be further connected to a communication board 53 that is configured to communicate with a data network either by wire or wirelessly. The type of the communication includes but is not limited to serial, TCP/IP, I2C or 2.4G wireless communication. In this embodiment, an optional battery module 80 may be configured to supply the power to the door lock system.

Figure 6:
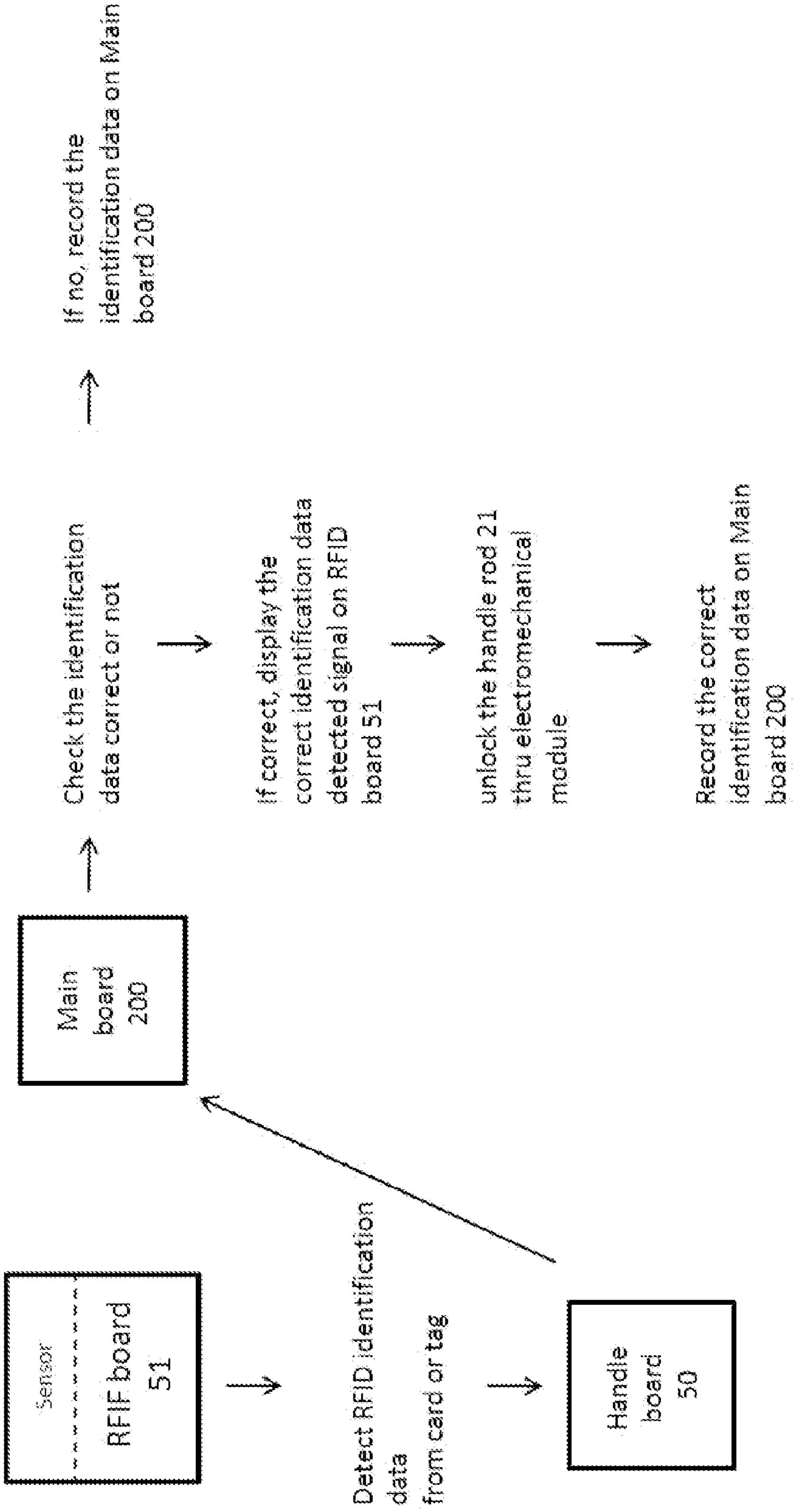
FIG. 6 shows a flow chart illustrating the process of the RFID card or tag detection according to an embodiment of the present patent application.

FIG. 6 shows a flow chart illustrating the process of the RFID card or tag detection according to an embodiment of the present patent application. The RFID board 51 detects the RFID identification data from card or tag. The handle board 50 communicates to the main board 200. The main board 200 checks whether the identification data is valid or not. If the identification data is valid, the RFID board 51 will display the valid identification data, unlock the handle rod 21 through the electromechanical module, and record the valid identification data on the main board 200. If the identification data is not valid, the main board 200 will record the invalid identification data.

Figure 7:
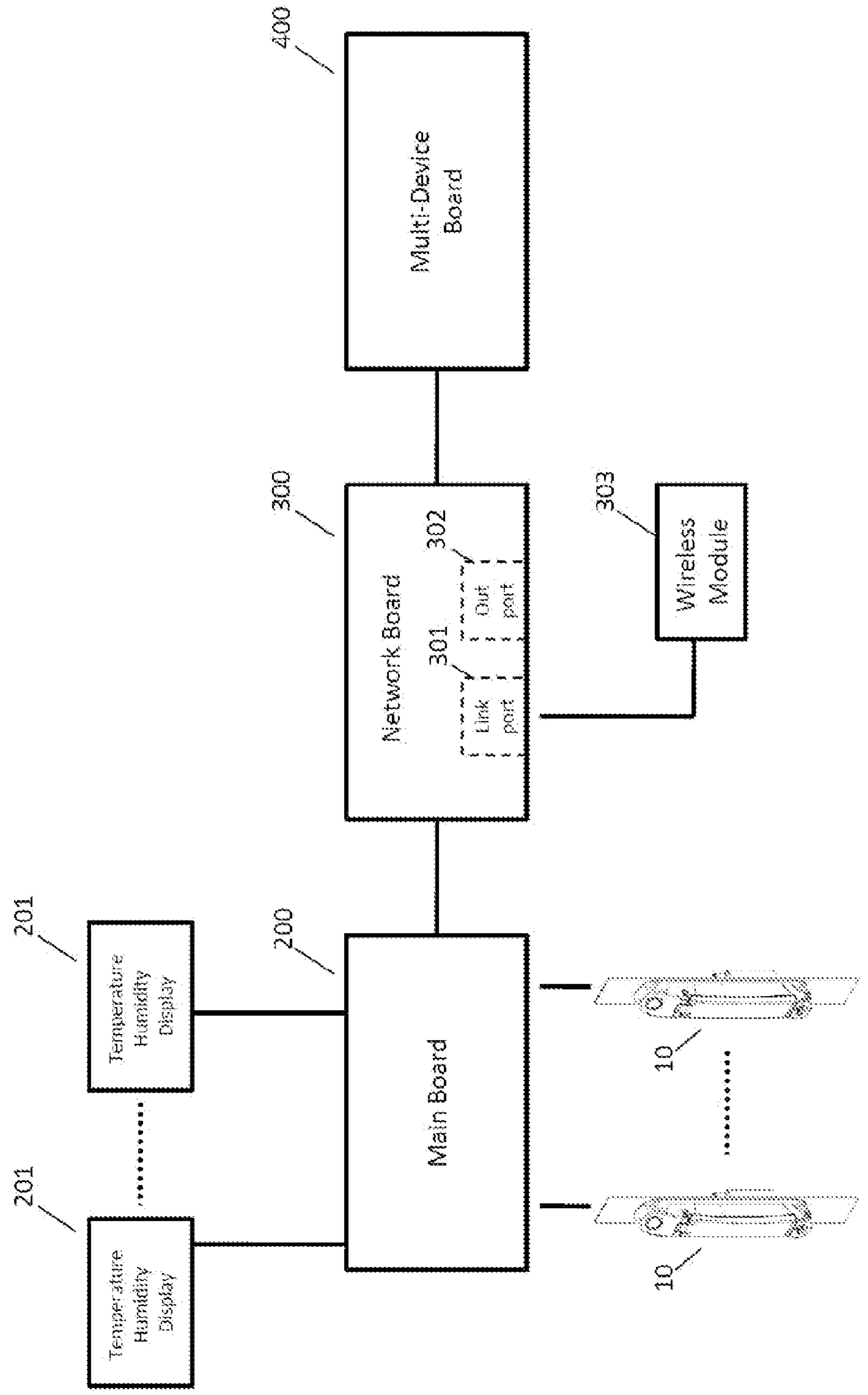
FIG. 7 illustrates a main board that is configured to control the door locking system according to an embodiment of the present application.

FIG. 7 illustrates a main board that is configured to control the door locking system according to an embodiment of the present application. Referring to FIG. 7, the main board 200 can be connected to the electromechanical module of the door locking system 10. The main board 200 can control the locking system 10 to unlock the handle rod 21 by electromechanical module through the handle board 50 and a communication board 53.

The main board 200 has multiple temperature displays or temperature and humidity displays 201. The display 201 shows the temperature or temperature and humidity data acquired from the door locking systems 10.

The main board 200 and a multi-device board 400 can be further connected to a computer network through a network board 300. The network board 300 has a link port 301 to communicate with the computer network. The link port 301 can be connected to the wireless module 303 enabling the network board 300 to be wirelessly connected to the computer network.

Figure 8:
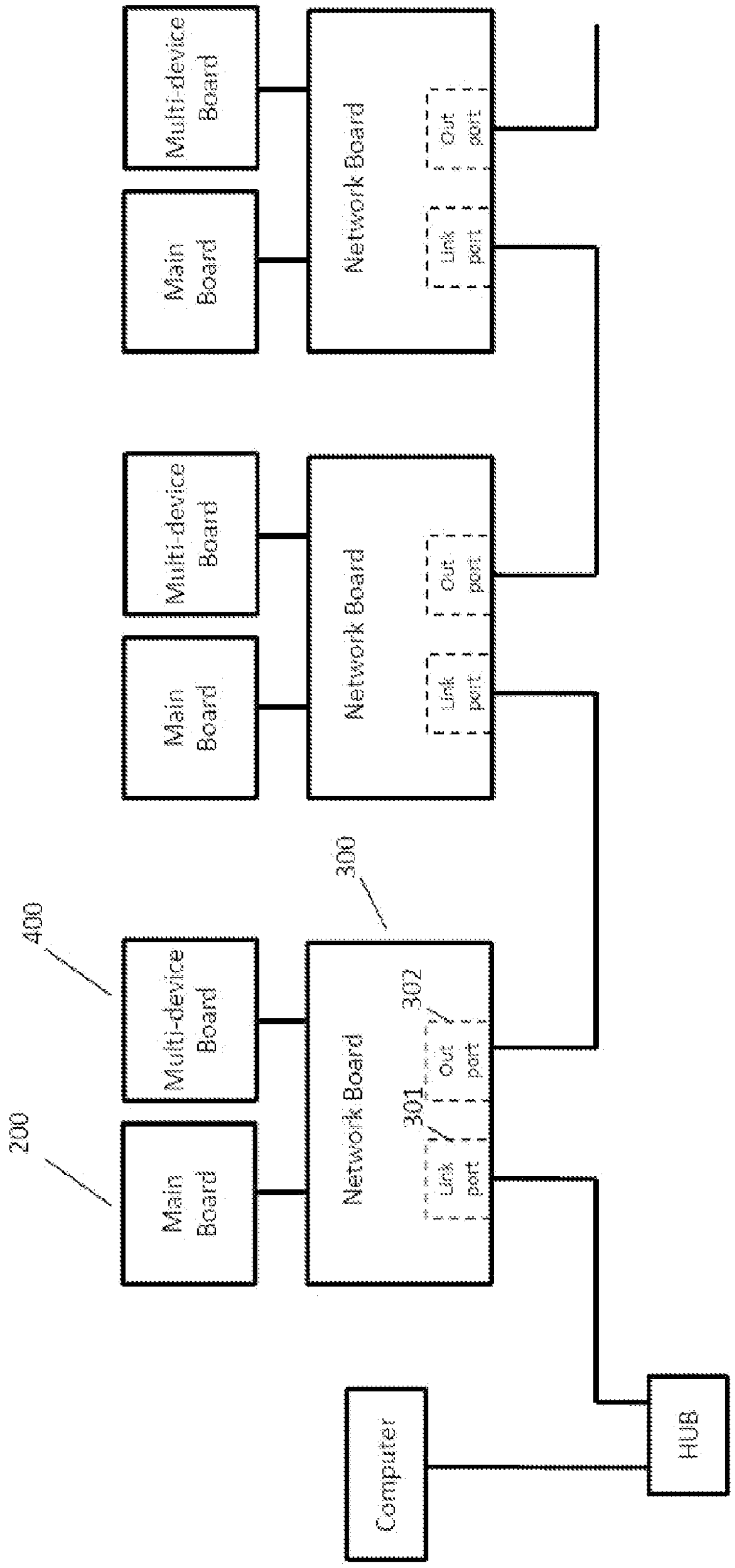
FIG. 8 illustrates multiple network boards being connected with each other and to a computer network according to an embodiment of the present patent application.

FIG. 8 illustrates multiple network boards being connected with each other and to a computer network according to an embodiment of the present patent application. Referring to FIG. 8, the multiple network boards 300 can be connect with each other and to a computer network. Each network board 300 has an out port 302 that is configured to communicate with another network board's link port 301. The network boards 300 can be connected with each other one by one as a chain and to a computer network.

The network board 300 has by-pass function on the link port 301 and out port 302. The data can pass through the link port 301 and out port 302 automatically even during a power failure.

Figure 9:
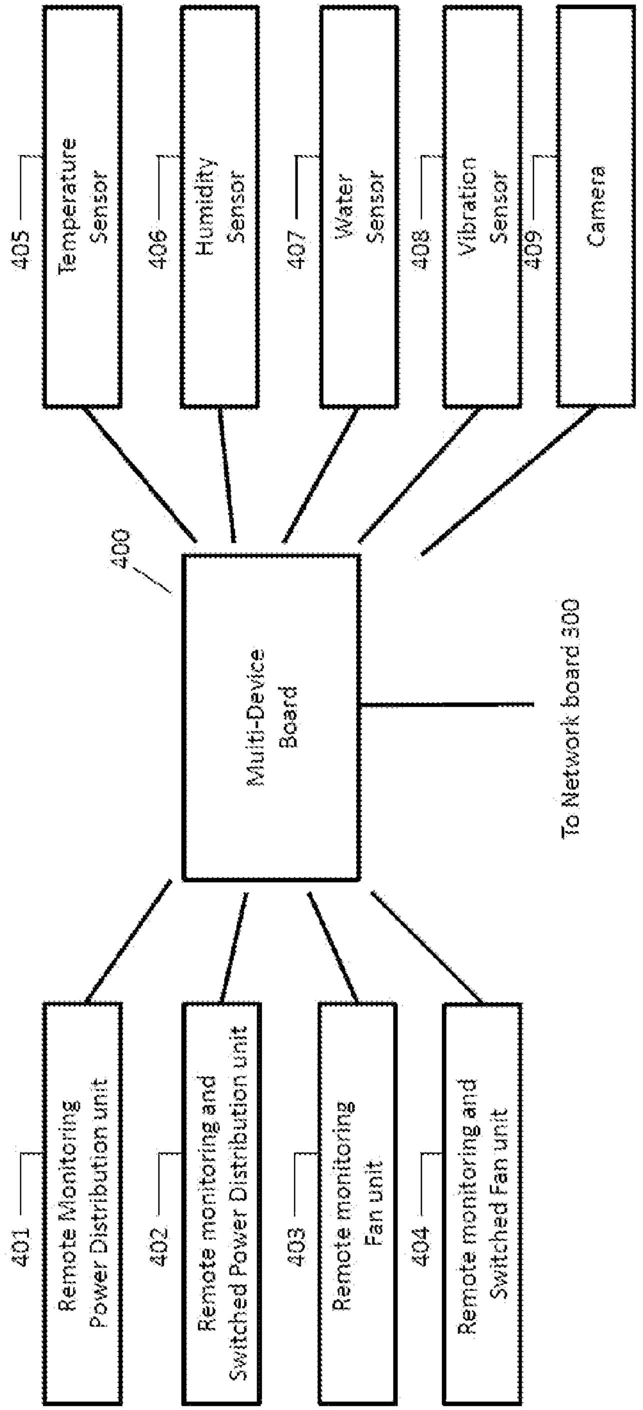
FIG. 9 illustrates a multi-device board that is connected to a network board to communicate with a computer network according to an embodiment of the present patent application.

FIG. 9 illustrates a multi-device board that is connected to a network board to communicate with a computer network according to an embodiment of the present patent application. Referring to FIG. 9, the multi-device board 400 is configured to be connected to the network board 300 to communicate with a computer network. It is further configured to monitor and control other devices with the computer network through the network board 300. The other devices include (but are not limited to) a remote monitoring power distribution unit 401, a remote monitoring and switched power distribution unit 402, a remote monitoring fan unit 403, a remote monitoring and switched fan unit 404, a temperature sensor 405, humidity sensor 406, a water sensor 407, a vibration sensor 408 and a camera 409.

The multi-device board 400 is configured to control the remote monitoring power distribution unit 401. The remote monitoring power distribution unit 401 is configured to monitor the individual socket and whole power distribution unit status, including but not limited to kilowatt per hour, power on, power off, voltage, ampere loading, temperature, humidity, vibration, noise level and ventilation.

The multi-device board 400 is configured to control the remote monitoring and switched power distribution unit 402, which can monitor and control the individual socket and whole power distribution unit status, including but not limited to kilowatt per hour, power on, power off, voltage, Ampere loading, temperature, humidity, vibration and ventilation.

The multi-device board 400 is configured to control the remote monitoring fan unit 403, which is configured to monitor the individual fan and whole fan unit status, including but not limited to fan on, fan off, fan speed, voltage, Ampere loading, temperature, humidity, vibration, noise level and ventilation.

The multi-device board 400 is configured to control the remote monitoring and switched fan unit 404, which is configured to control and monitor the individual fan and whole fan unit status, including but not limited to fan on, fan off, fan speed, voltage, Ampere loading, temperature, humidity, vibration, noise level and ventilation.

The multi-device board 400 is configured to monitor the nearby temperature by the temperature sensor 405, and also the nearby humidity by the humidity sensor 406.

The multi-device board 400 is configured to monitor the presence of water nearby by the water sensor 407, and also the vibration by the vibration sensor 408.

The multi-device board 400 is configured to watch and capture nearby environment by the camera 409.

In this embodiment, the door locking system 10 may apply different types of RFID sensors to detect different RFID cards or tags. One main board 200 may control multiple door locking systems 10. The door locking system may also support wireless data communication with the main board 200.

The door locking system 10 is configured to support a DC motor to drive the physical lock. The door locking system may support mini USB (5V) plug-in for emergency power to unlock the door by authorized card access. The door locking system 10 may include either a digital door senor or a mechanical door sensor to detect whether the door frame is open or closed in a cabinet.

The door locking system is configured to support a low cost I2C temperature sensor connected to the handle, and transmit the temperature reading to the main board. The temperature range is from −32 to ~+99.9° C. (−27.22~+211.82° F.), with +/−1 degree accuracy.

The door locking system 10 is configured to send the door sensor status to the main board regarding whether the door frame is open or closed in a cabinet. The status includes card access status (when the handle is locked only authorized card is accepted to unlock the handle), physical key unlock status (the handle is unlocked) and physical key lock status (handle is locked and only physical key can unlock the handle).

The door locking system 10 includes a plurality of LED indicators. A first LED indicator indicates a power-on and normal status, and a second LED indicator indicates an authorized card access. A third LED indicator indicates unauthorized card detection.

The door locking system is configured to support different audio outputs, for example, include but are not limited to authorized card detection, unauthorized card detection and/or an alarm status. The door locking system may further support battery box connection (2-pin), in case the user can't provide a DC power in the cabinet as a power input.

In the above embodiments, although RFID is disclosed as an example, it should be noted that other types of wireless identification measures may be used in the door locking system.

While the present patent application has been shown and described with particular references to a number of embodiments thereof, it should be noted that various other changes or modifications may be made without departing from the scope of the present invention.

What is claimed is:

1. A door locking system comprising:

a plurality of door locks;

a plurality of main boards each connected to the plurality of door locks;

a plurality of network boards each connected to one of the main boards; and a plurality of multi-device boards each connected to one of the network boards; wherein:

each door lock comprises a handle rod and a latch configured to lock the handle rod, the latch being connected to and controlled by a lock mechanism, the lock mechanism comprising a mechanical module and an electromechanical module, the mechanical module being configured to actuate the latch to lock and unlock the handle rod, and configured to grant the electromechanical module control over the latch to lock and unlock the handle rod;

all the network boards are connected with each other one by one as a chain and to a computer network; and each multi-device board is configured to connect a plurality of sensors for monitoring the operation of the door locking system and the environment nearby;

the mechanical module comprising:

1) a first position to lock the handle rod through the latch;

2) a second position to unlock the handle rod through the latch, while the electromechanical module being configured not to control the handle rod; and 3) a third position to unlock the handle rod through the latch, while the electromechanical module being configured to lock and unlock the handle rod through the latch.

2. The door locking system of claim 1, wherein the mechanical module comprises a mechanical key lock with a dish, and the electromechanical module comprises a motor or a solenoid and is controlled by an electrical signal.

3. The door locking system of claim 1, wherein the electromechanical module is connected to and controlled by a handle board and a RFID (radio frequency identification) board, the RFID board being configured to identify a RFID card or tag placed nearby.

4. A door locking system comprising:

a plurality of door locks;

a main board connected to the plurality of door locks;

a network board connected to the main board; and a multi-device board connected to the network board; wherein:

each door lock comprises a handle rod and a latch configured to lock the handle rod, the latch being connected to and controlled by a lock mechanism, the lock mechanism comprising a mechanical module and an electromechanical module, the mechanical module being configured to actuate the latch to lock and unlock the handle rod, and configured to grant the electromechanical module control over the latch to lock and unlock the handle rod;

the main board is connected to a computer network through the network board; and the multi-device board is configured to connect a plurality of sensors for monitoring the operation of the door locking system and the environment nearby;

the mechanical module comprising:

1) a first position to lock the handle rod through the latch;

2) a second position to unlock the handle rod through the latch, while the electromechanical module being configured not to control the handle rod; and 3) a third position to unlock the handle rod through the latch, while the electromechanical module being configured to lock and unlock the handle rod through the latch.

5. The door locking system of claim 4, wherein the mechanical module comprises a mechanical key lock with a dish, and the electromechanical module comprises a motor or a solenoid, and is controlled by an electrical signal.

6. The door locking system of claim 4, wherein the electromechanical module is connected to and controlled by a handle board and a RFID (radio frequency identification) board, the RFID board being configured to identify a RFID tag or card placed nearby.

7. The door locking system of claim 6, wherein the handle board is further connected to a sensor board for detecting the status of the door frame in the cabinet, temperature, humidity, and vibration.

8. The door locking system of claim 6, wherein the handle board is further connected to a status board for detecting the status of the mechanical module.

9. The door locking system of claim 6, wherein the handle board is further connected to a communication board for communicating with a data network either by wire or wirelessly, and the communication board is connected to the main board.

10. The door locking system of claim 6, wherein the RFID board comprises a biometric information reader, the biometric information reader being configured to acquire biometric authentication data from a user and transmit the data to the handle board and the electromechanical module.

11. The door locking system of claim 7, wherein the main board comprises a plurality of displays, the displays being configured to show the temperature or humidity data acquired from the door locking system.

12. A door locking system configured to lock and unlock a door frame of a cabinet, the door locking system comprising:

a handle rod;

a digital or mechanical door sensor configured to detect whether the door frame of the cabinet is open or closed; and a latch configured to lock the handle rod, the latch being connected to and controlled by a lock mechanism, the lock mechanism comprising a mechanical module and an electromechanical module; wherein:

the mechanical module is configured to actuate the latch to lock and unlock the handle rod, and configured to grant the electromechanical module control over the latch to lock and unlock the handle rod;

the mechanical module comprising:

1) a first position to lock the handle rod through the latch;

2) a second position to unlock the handle rod through the latch, while the electromechanical module being configured not to control the handle rod; and 3) a third position to unlock the handle rod through the latch, while the electromechanical module being configured to lock and unlock the handle rod through the latch.

13. The door locking system of claim 12, wherein the mechanical module comprises a mechanical key lock with a dish, and the electromechanical module comprises a motor or a solenoid, and is controlled by an electrical signal.

14. The door locking system of claim 12, wherein the electromechanical module is connected to and controlled by a handle board and a RFID (radio frequency identification) board, the RFID board being configured to identify a RFID card or tag placed nearby.

15. The door locking system of claim 14, wherein the handle board is further connected to a sensor board for detecting temperature, humidity, and vibration.

16. The door locking system of claim 14, wherein the handle board is further connected to a status board for detecting the status of the mechanical module.

17. The door locking system of claim 14, wherein the handle board is further connected to a communication board for communicating with a data network either by wire or wirelessly.

18. The door locking system of claim 14, wherein the RFID board comprises a biometric information reader, the biometric information reader being configured to acquire biometric authentication data from a user and transmit the data to the handle board and the electromechanical module.

19. The door locking system of claim 17 further comprising a main board and a network board, wherein the communication board is connected to the main board and the main board is connected to a computer network through the network board.

20. The door locking system of claim 19 further comprising a multi-device board, wherein the multi-device board is configured to connect a plurality of sensors for monitoring the operation of the door locking system.

21. The door locking system of claim 17 further comprising an out port on the network board, wherein the out port is configured to communicate with another network board's link port, then the network board can be connected with each other one by one as a chain and to a computer network.

* * * * *